3,200,063
HYDROCRACKING PROCESS WITH A CATALYST COMPOSITE COMPRISING SILVER OR COPPER ADMIXED WITH A GROUP VIB METAL ON AN ACID ACTING REFRACTORY OXIDE BASE
William B. Wilson, Pleasant Hill, Calif., assignor to Shell Oil Company, New York, N.Y., a corporation of Delaware
No Drawing. Filed Oct. 25, 1962, Ser. No. 233,130
26 Claims. (Cl. 208—111)

This invention relates to a process for the catalytic conversion of hydrocarbons and an improved catalyst therefor. In particular the invention is related to the hydrocracking of hydrocarbons with a catalyst comprising a metal of Group IB and a metal of Group VIB of the Periodic Table of Elements.

Destructive hydrogenation, more commonly called hydrocracking, by catalytic means is a well known process which has been practiced commercially in Europe before and during World War II. Destructive hydrogenation of hydrocarbon oil, usually a coal tar or a high-boiling petroleum fraction, such as gas oils or cycle stocks, generally is carried out at quite high temperatures and pressures on the order of 850° F. and 1500 p.s.i.g. and up. In addition, the hydrocracking process is usually carried out in two or more stages, the first stage being a hydrogenation stage to remove deleterious impurities in the feed, and the second stage being the actual hydrocracking stage. Hydrogenation in the first stage usually is sufficiently severe to assure almost complete removal of nitrogen compounds, i.e. to below about 10 parts per million, and preferably 5 parts per million. Nitrogen compounds are considered to be a poison for most, if not all, hydrocracking catalysts.

More recently, the hydrocracking process has received favorable attention in America. While hydrocracking has inherent advantages over conventional catalytic cracking, such as a lower gas and coke make, it is generally considered as a complementary process to conventional catalytic cracking because gas oils and cycle stocks from the catalytic cracking process are excellent hydrocracking feeds. Activity has generally been centered in the development of highly active and stable catalysts for the conversion process. Early catalysts for the hydrocracking process comprised a hydrogenation component on an activated clay, such as tungsten disulfide on HF activated Terrana clay, or iron on HF activated montmorillonite. After the war, improved catalysts such as molybdenum or nickel on silica-alumina were developed. More recently hydrocracking processes have been described which employ nickel sulfide or cobalt sulfide on silica-alumina or platinum or palladium group metal deposited on an acidic refractory oxide support such as silica-alumina.

A hydrocracking process has now been found which employs a catalyst comprising a Group IB metal and a Group VIB metal associated with an acid-acting inorganic refractory oxide. While it is known that Group IB metals have catalytic properties, notably for chemical manufacture, e.g. silver is well known for oxidizing ethylene to ethylene oxide, they are remarkably weak hydrogenation catalysts by themselves, and therefore have been up to now of little, if any, interest for hydrocracking. It has been found that metals of Group IB, in combination with metals of Group VIB, when associated with an acid-acting inorganic refractory oxide support such as silica-alumina exhibit strong catalytic activity for hydrocracking hydrocarbon oils.

The amount of Group IB metal incorporated in the catalyst, expressed as a percent of the total weight of the catalyst, can vary from about 0.1% to 20%, and preferably about 1% to 10%. The Group VIB metal is present in an amount from about 0.1% to 20% by weight and preferably 1% to 10% by weight. The amount of metal in the catalyst is calculated on the basis of elemental metal.

The catalysts are not necessarily equivalent in activity and stability. Of the Group IB metals, gold is considerably less active than silver or copper, which are preferred. The catalysts containing silver are particularly active and stable and are especially preferred. This is surprising as silver is generally considered to have less catalytic activity than copper. Of the Group VIB metals, tungsten and molybdenum are preferred. Highly active and stable catalysts which are particularly preferred are silver in combination with tungsten or molybdenum, especially tungsten.

The Group IB and Group VIB metals are associated with an amorphous acid-acting inorganic refractory oxide having the ability to catalyze the splitting of carbon to carbon bonds, such as, for example, silica-magnesia, silica-alumina, silica-alumina-boria and the like. The preferred support is predominantly silica and contains from about 50% to about 90% silica with the remainder, i.e. about 50% to 10% alumina. A particularly preferred silica-alumina catalyst base comprises from about 70% to 90% silica and from about 30% to 10% alumina. Amorphous acid-acting inorganic refractory oxides are widely known as active catalytic cracking catalysts and are to be distinguished from the crystalline alumino-silicates generally referred to as molecular sieves.

It is generally advantageous to incorporate fluorine into the catalyst, the amount of fluorine varying from about 0.1% to about 5% by weight, and preferably from about 1% to about 3% by weight based on the total weight of the catalyst. In general, a larger amount of fluorine is incorporated into the catalyst as the alumina content of the support is increased.

The catalysts are prepared by incorporating at least the Group IB metal into a hydrogel of the refractory oxide base, either during or after formation of the hydrogel. For example, a soluble salt of the Group IB metal such as copper nitrate or silver nitrate can be incorporated into a silica-alumina hydrogel during formation of the hydrogel. The hydrogel can be formed in an alkaline solution, such as by mixing sodium silicate and sodium aluminate or in an acidic solution such as by mixing sodium silicate and aluminum sulfate. Acids, such as sulfuric acid or bases such as ammonium hydroxide can be employed as necessary to provide the desired pH. The hydrogel, containing the Group IB metal can be washed with, for example, ammonium nitrate solution and water to remove sodium ions and sulfate ions. This method of incorporating silver into the hydrogel has the disadvantage that a considerable portion of the silver is removed from the hydrogel during the washing operation.

It is preferred to incorporate the Group IB metal into the catalyst by contacting a hydrogel such as silica-alumina hydrogel, preferably after having been washed with ammonium solution, e.g. ammonium nitrate, and water to remove sodium ions, with a solution of a Group IB metal salt, such as silver nitrate, wherein the metal is in the form of cations. Metals are thereby ion-exchanged into the hydrogel. It is generally advantageous to treat the hydrogel with ammonium hydroxide prior to the ion-exchange.

The Group VIB metal can be incorporated into the catalyst by any suitable means. Except for chromium, the Group VIB metals are not readily available in cationic form and therefore are not adaptable to the ion exchange method. The Group VIB metal can be conveniently added to the catalyst by simple impregnation methods, either before or after the base is dried or calcined. It is usually preferred to impregnate the Group VIB metal onto the dried base before calcination so as to avoid a double calcination.

For a catalyst containing fluorine, it is generally desirable to incorporate the fluorine into the silica-alumina hydrogel. This is conveniently accomplished by the addition of sodium fluoride to the sodium aluminate solution which is mixed with sodium silicate solution to form a coprecipitated silica-alumina hydrogel.

In the hydrocracking process, feed is introduced to the reaction zone as a liquid, vapor or mixed liquid vapor phase, depending on the temperature, pressure and amount of hydrogen mixed with the feed and the boiling range of the feed stock utilized. The hydrocarbon feed, including fresh as well as recycled feed, is introduced into the reaction zone with a large excess of hydrogen since the hydrocracking process is accompanied by rather high consumption of hydrogen, usually on the order of 500 to 2000 standard cubic feet of hydrogen per barrel of total feed converted. Conversion herein refers to the products obtained which boil below 420° F. Excess hydrogen is recovered at least in part from the reaction zone effluent and recycled to the reactor, together with additional makeup hydrogen. Pure hydrogen is not necessary, as any suitable hydrogen-containing gas which is predominantly hydrogen can be used. Particularly suitable is a hydrogen-rich gas containing on the order of 70% to 90% hydrogen, which is obtained from a catalytic reforming process.

Hydrocracking feed is a hydrocarbon distillate, preferably boiling above the boiling range of gasoline, for example boiling in the range of about 350° to 950° F., and preferably in the range of about 550° to 800° F. It is generally desirable to subject the hydrocarbon feed to a suitable pretreatment such as a catalytic hydrogenation treatment with a hydrogenation catalyst, e.g. cobalt or nickel and molybdenum on alumina. An advantage of such a hydrogenation treatment is to remove from the feed coke-forming constituents which tend to deposit on the hydrocracking catalyst and to remove impurities such as nitrogen compounds which act as a hydrocracking suppressor.

The effect of nitrogen compounds on a hydrocracking catalyst performance depends to a certain extent upon the type of the nitrogen compound and thus, in a practical sense, upon the nature of the feed. For example, in a homologous series such as pyridine, quinoline and acridine, the rate of decrease of activity is related to the basicity and vapor pressure of the compound. On the other hand, even certain relatively non-basic compounds such as benzonitrile can be strong poisons. In general, therefore, the nitrogen content of a light feed such as light gas oil may be higher than that of a heavy feed such as a heavy gas oil. Moreover, the nitrogen content of a straight-run gas oil may be somewhat higher than that of a similar boiling catalytically cracked gas oil, since a portion of the nitrogen compounds in straight-run gas oil seems to be innocuous or easily converted to less deleterious forms. Thus, while some feeds of quite high nitrogen content may be hydrocracked, better results are obtained if the total nitrogen content of the feed is reduced to below about 100 p.p.m. W and preferably below 30 p.p.m. W.

Operating conditions employed in the hydrocracking conversion include a temperature in the range of about 500° to about 850° F., a hydrogen to oil mole ratio of about 5 to 50, a pressure of about 500 to 3000 p.s.i.g. and a liquid hourly space velocity of about 0.1 to about 10, preferably 0.5 to 5. Under normal conditions, total pressure employed in the hydrocracking zone will be in the range of from about 1000 to 2000 p.s.i.g. For a given partial pressure of hydrogen in the reaction zone, total pressure will depend on such factors as purity of the hydrogen gas, hydrogen/oil ratio and the like. Too low a partial pressure of hydrogen tends to decrease catalyst life, while too high a partial pressure tends to saturate aromatics, which results in excessive hydrogen consumption and loss of octane quality of the gasoline product.

Although the activity of the catalyst is maintained for a long period of time, it may be necessary to regenerate the catalyst after a long period of service to extend its useful life. Regeneration of the catalyst can be effected by treatment with air or other oxygen-containing gas in a known manner to burn carbonaceous deposits therefrom. In general, it is preferred to control regeneration temperature so as not to exceed about 1200° F.

The invention is illustrated in more detail in the following examples.

EXAMPLE I

A series of catalysts was prepared and tested in a bench scale hydrocracking unit. In catalysts 1 through 7, the Group IB metal was incorporated into the silica-alumina hydrogel. Silver was incorporated into the catalyst by ion-exchange by contacting silica-alumina hydrogel, which had been washed with ammonium nitrate and ammonium hydroxide to remove sodium ions, with silver nitrate solution. Copper was incorporated into the catalyst by co-gelation with the silica-alumina. The Group VIB metal was impregnated into the silica-alumina (wet or partially dried hydrogel) after the Group IB metal had been incorporated therein. Each catalyst contained about 1.5% F which was incorporated into the catalyst by co-gelation with the silica-alumina. The finished catalysts were calcined in air at about 1020° F. prior to use.

Catalysts 8 through 13 were prepared by impregnating the metal onto calcined silica-alumina support. Catalysts 8 and 9 contained no fluorine, the metal being deposited on a low alumina (13% $Al_2O_3$) cracking catalyst. In catalysts 10 through 13, the metal was deposited on high alumina (25% $Al_2O_3$) cracking catalyst with about 2% w. fluorine incorporated therein by impregnation.

Each catalyst was employed as a fixed bed to hydrocrack hydrogenated catalytically cracked gas oil (ca. 650°/800° F. ASTM 10%/90%) having a total nitrogen content of 2 p.p.m. W. Operating conditions were 4 LHSV, 644° F. (340° C.), 1500 p.s.i.g. and 10/1 hydrogen/oil mole ratio. Activity and stability were determined for each catalyst. Activity index corresponds to conversion to material boiling below 420° F. at 3 hours time, whereas stability is the percent retention of activity after a decade of running, e.g. indicated activity at 10 hours as a percent of activity at 1 hour. Results are given in Table I.

*Table I*

| | 1 | 2 | 3 | 4 | 5 | 6 | 7 | 8 | 9 | 10 | 11 | 12 | 13 |
|---|---|---|---|---|---|---|---|---|---|---|---|---|---|
| Cu, percent w | 9 | 5 | | | | | | | | | | | |
| Ag, percent w | | | 5 | 5 | 5 | 10 | 5 | | 5 | 5 | 5 | | |
| Mo, percent w | | 5 | 5 | 10 | | 5 | | | | | 5 | 5 | |
| W, percent w | | | | | 10 | | | | | 5 | | | 10 |
| Cr, percent w | | | | | | | 5 | 5 | | | | | |
| Activity | 25 | 50 | 65 | 60 | 60 | 65 | 55 | 9 | 33 | 35 | 30 | 35 | 35 |
| Stability | 40 | 70 | 70 | 60 | 70 | 65 | 50 | 30 | 75 | 55 | 75 | 85 | 80 |
| Test Duration, vol. oil/vol. cat | 28 | 26 | 30 | 26 | 12 | 26 | 22 | 12 | 26 | 22 | 26 | 26 | 24 |

EXAMPLE II

Catalyst No. 3 of Example I was tested in a bench scale hydrocracking unit for an extended period of time with hydrogenated catalytically cracked heavy gas oil similar to that described in Example I. The operation was conducted at a liquid hourly space velocity of 1, a pressure of 1500 p.s.i.g., and hydrogen/oil mole ratio of 10/1. Temperature was adjusted as necessary to maintain conversion at about 60% w. Excellent stability of the catalyst is indicated by the slight increase in temperature demand during the test, the required temperature increasing from about 585° F. at 30 hours to about 650° F. at 1600 hours. Life of the silver molybdenum catalyst before regeneration is more than about three times that of a silver catalyst (without molybdenum) with a similar feed.

Isoparaffin to normal paraffin ratios of the light hydrocarbons in the product were good, as may be seen from Table II.

*Table II*

Conditions:
- Period, hours _____ 320
- Temperature, °F. _____ 612
- H₂/oil mole ratio _____ 10
- LHSV _____ 1

Results:
- Conversion, percent w. <420° F. _____ 59
- H₂ consumption, s.c.f./bbl. _____ 774

Yields, percent w. gas:
- <C₄ _____ 1.0
- C₄ _____ 4.2
- C₅ _____ 4.6
- C₆ _____ 5.8

Ratio, i/n:
- C₄ _____ 2.5
- C₅ _____ 13
- C₆ _____ 20

A similar extended test was made with catalyst No. 5 of Example I. Temperature demand increased from about 595° F. at 30 hours to only 642° F. at about 1400 hours, which demonstrates excellent stability of the catalyst. The temperature of 635° F. considered to be slightly higher than might normally be required because of mechanical difficulties toward the end of the period which appeared to result in some degree of damage to the catalyst.

EXAMPLE III

A catalyst comprising about 5% w. silver and 10% w. tungsten was prepared by incorporating silver ions into a fluoride-containing silica-alumina hydrogel by ion-exchange followed by incorporating the tungsten on the wet ion-exchanged hydrogel by impregnation.

The catalyst, after calcination, was employed to hydrocrack a blend consisting of 80% by volume heavy straight-run gas oil and 20% by volume heavy catalytically cracked gas oil. Total nitrogen content of the blend was about 80 p.p.m. W. The hydrocracking was conducted at 1,500 p.s.i.g. and 15/1 H₂/oil mole ratio. Space velocity, initially at 0.5, was increased to 1 after about 300 hours operation. The operation was arbitrarily terminated after about 350 hours. Activity appeared to be quite stable with no significant activity decline rate being indicated. Temperature required to maintain 60% w. conversion at the end of the period was 693° F. This operation demonstrates tolerance of the catalyst for relatively high nitrogen-containing feeds.

I claim as my invention:

1. A method of hydrocracking a hydrocarbon oil boiling in the range from about 350° F. to 950° F. which comprises contacting said oil in the presence of hydrogen under hydrocracking conditions with a catalyst comprising from about 0.1% to 20% by weight of a first metal selected from the group consisting of copper and silver and about 0.1% to 20% by weight of a metal of Group VIB intimately associated with an acid-acting refractory oxide, said catalyst being prepared by incorporating at least the first metal into a hydrogel of the refractory oxide.

2. A method of hydrocracking a hydrocarbon oil boiling in the range from about 350° F. to 950° F. which comprises contacting said oil in the presence of hydrogen under hydrocracking conditions with a catalyst comprising from about 0.1% to 20% by weight of a first metal selected from the group consisting of copper and silver and about 0.1% to 20% by weight of a metal of Group VIB intimately associated with a silica-alumina, said catalyst being prepared by incorporating at least the first metal into a hydrogel of the silica-alumina.

3. A method of hydrocracking a hydrocarbon oil boiling in the range from about 350° F. to 950° F. which comprises contacting said oil with a catalyst comprising from about 0.1% to 20% by weight silver and 0.1% to 20% by weight tungsten intimately associated with an acid-acting refractory oxide support at a temperature in the range from about 500° to 850° F., a pressure in the range from 500 to 3000 p.s.i.g., a liquid hourly space velocity of 0.1 to 10 and a hydrogen to oil mole ratio in the range from about 5 to 50, said catalyst being prepared by incorporating at least the silver into a hydrogel of the refractory oxide.

4. A method of hydrocracking a hydrocarbon oil boiling in the range from about 350° F. to 950° F. which comprises contacting said oil with a catalyst comprising from about 0.1% to 20% by weight silver and 0.1% to 2000% by weight tungsten intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst being prepared by incorporating at least the silver into a hydrogel of the silica-alumina.

5. The method according to claim 4 wherein the hydrocarbon is a gas oil having a nitrogen content of less than 100 parts per million by weight and from about 0.1 to 5% by weight fluorine is incorporated into the hydrogel.

6. A method of hydrocracking a hydrocarbon oil boiling in the range from about 350° F. to 950° F. which comprises contacting said oil with a catalyst comprising from about 0.1% to 20% by weight silver and 0.1% to 20% by weight molybdenum intimately associated with silica-alumina cracking catalyst at a temperature in the range from about 500° to 8500° F., a pressure of about 500 to 3000 p.s.i.g., a liquid hourly space velocity from about 0.1 to 10 and a hydrogen to oil mole ratio in the range from about 5 to 50, said catalyst being prepared by incorporating at least the silver into a hydrogel of the silica-alumina.

7. The method according to claim 6 wherein the hydrocarbon is a gas oil having a nitrogen content of less than 100 parts per million by weight, and from about 0.1 to 5% by weight fluorine is incorporated into the hydrogel.

8. A method of hydrocracking a hydrocarbon oil boiling in the range from about 350° F. to 950° F. which comprises contacting said oil with a catalyst comprising from about 0.1% to 20% by weight copper and 0.1% to 20% by weight tungsten intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst being prepared by incorporating at least the copper into a hydrogel of the silica-alumina.

9. The method according to claim 8 wherein the hydrocarbon is a gas oil having a nitrogen content of less than 30 parts per million by weight, and from about 0.1 to 5% by weight fluorine is incorporated into the hydrogel.

10. A method of hydrocracking a hydrocarbon oil boiling in the range from about 350° F. to 950° F. which comprises contacting said oil with a catalyst comprising from about 0.1% to 20% by weight copper and 0.1% to 20% by weight molybdenum intimately associated with silica-alumina cracking catalyst at a temperature in the range from about 500° to 850° F., a pressure of about 500 to 3000 p.s.i.g., a liquid hourly space velocity from about 0.1 to 10 and a hydrogen to oil mole ratio in the range from about 5 to 50, said catalyst being prepared by incorporating at least the copper into a hydrogel of the silica-alumina.

11. The method according to claim 10 wherein hydrocarbon is a gas oil having a nitrogen content of less than 30 parts per million by weight, and from about 0.1 to 5% by weight fluorine is incorporated into the hydrogel.

12. A catalyst suitable for hydrocracking hydrocarbon oils which comprises from about 0.1% to 20% by weight of a first metal selected from the group consisting of copper and silver and about 0.1% to 20% by weight of a Group VIB metal intimately associated with an acid-acting refractory oxide, said catalyst being prepared by incorporating at least the first metal into a hydrogel of the refractory oxide.

13. A catalyst suitable for hydrocracking hydrocarbon oils which comprises from about 0.1% to 20% by weight of a first metal selected from the group consisting of copper and silver and about 0.1% to 20% by weight of a Group VIB metal intimately associated with silica-alumina, said catalyst being prepared by incorporating at least the first metal into a silica-alumina hydrogel.

14. The catalyst according to claim 13 wherein at least the first metal is incorporated into the catalyst by contacting a silica-alumina hydrogel with an aqueous solution of a compound of said metal wherein the metal is present as a cation.

15. A catalyst suitable for hydrocracking hydrocarbon oils which comprises from about 0.1% to 20% by weight copper and about 0.1% to 20% by weight tungsten intimately associated with silica-alumina, at least the copper being incorporated into the silica-alumina while the silica-alumina is a hydrogel.

16. A catalyst suitable for hydrocracking hydrocarbon oils which comprises from about 0.1% to 20% by weight copper and about 0.1% to 20% by weight molybdenum intimately associated with silica-alumina, at least the copper being incorporated into the silica-alumina while the silica-alumina is a hydrogel.

17. A catalyst suitable for hydrocracking hydrocarbon oils which comprises from about 0.1% to 20% by weight silver and about 0.1% to 20% by weight tungsten intimately associated with silica-alumina, at least the silver being incorporated into the silica-alumina while the silica-alumina is a hydrogel.

18. A catalyst suitable for hydrocracking hydrocarbon oils which comprises from about 0.1% to 20% by weight silver and about 0.1% to 20% by weight molybdenum intimately associated with silica-alumina, at least the silver being incorporated into the silica-alumina while the silica-alumina is a hydrogel.

19. The method according to claim 1 wherein from about 0.1 to 5% fluorine is incorporated into the hydrogel.

20. The method according to claim 1 wherein each metal is incorporated into the hydrogel.

21. The method according to claim 2 wherein each metal is incorporated into the hydrogel.

22. The process according to claim 5 wherein the tungsten is incorporated into the hydrogel.

23. The process according to claim 9 wherein the tungsten is incorporated into the hydrogel.

24. The catalyst according to claim 12 wherein from about 0.1 to 5% by weight fluorine is incorporated into the hydrogel.

25. The catalyst according to claim 24 wherein the Group VIB metal is incorporated into the hydrogel.

26. The catalyst according to claim 25 wherein the hydrogel is a silica-alumina hydrogel.

References Cited by the Examiner

UNITED STATES PATENTS

| | | | |
|---|---|---|---|
| 2,926,130 | 2/60 | Hogan | 208—111 |
| 2,944,005 | 7/60 | Scott | 208—109 |
| 3,037,930 | 6/62 | Mason | 208—112 |
| 3,073,777 | 1/63 | Oettinger | 208—112 |

ALPHONSO D. SULLIVAN, *Primary Examiner.*